May 10, 1949.                P. MAINARDI ET AL                 2,469,927
                       INFINITY SIGHT VIEW FINDERS
Filed Aug. 6, 1947                                    3 Sheets-Sheet 1
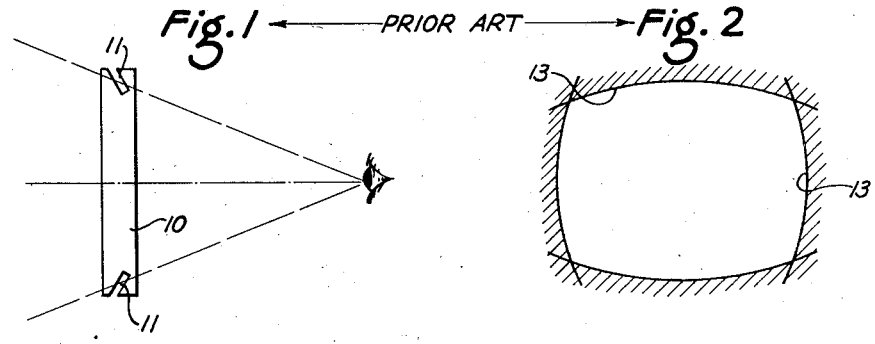
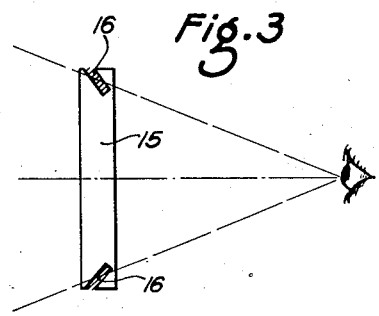
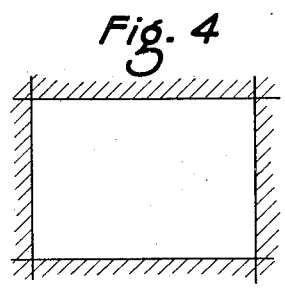
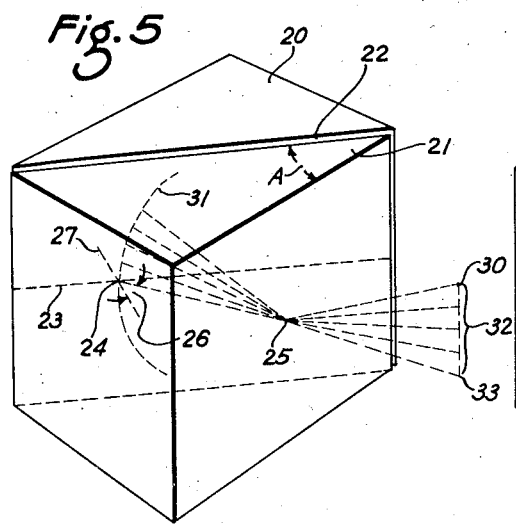
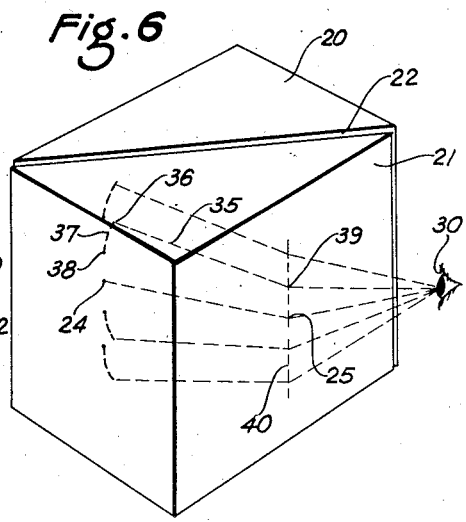
Pompey Mainardi
Marcus N. Mainardi
       INVENTORS
BY
   ATTORNEYS May 10, 1949.　　　　P. MAINARDI ET AL　　　　2,469,927
INFINITY SIGHT VIEW FINDERS
Filed Aug. 6, 1947　　　　　　　　　　　　　3 Sheets-Sheet 2
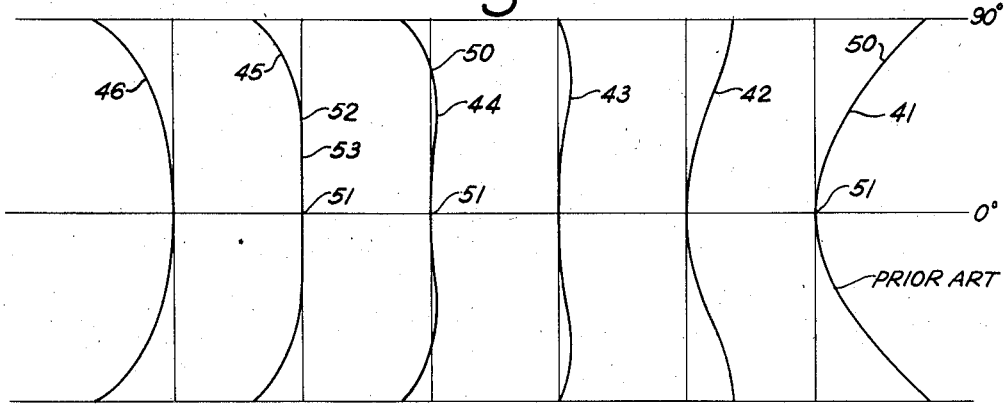
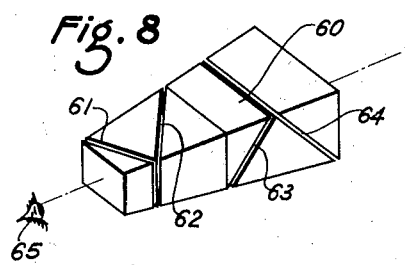
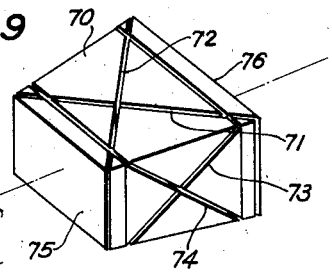
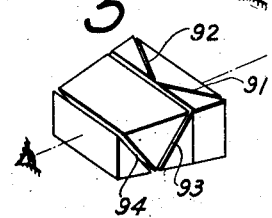
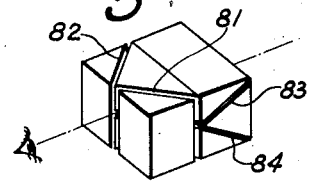
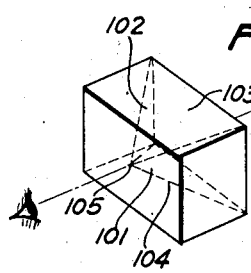
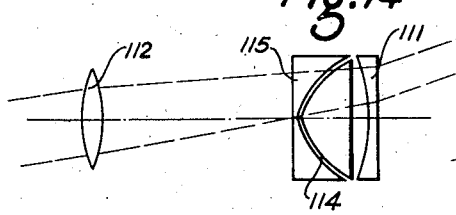
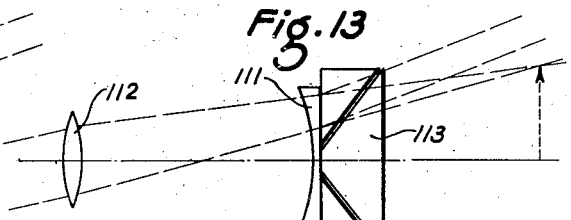
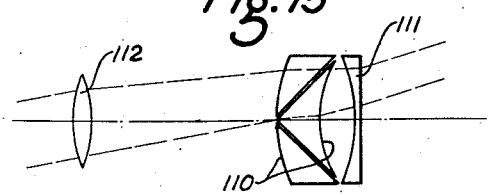
Pompey Mainardi
Marcus N. Mainardi
INVENTORS
BY
ATTORNEYS May 10, 1949.  P. MAINARDI ET AL  2,469,927
INFINITY SIGHT VIEW FINDERS
Filed Aug. 6, 1947  3 Sheets-Sheet 3
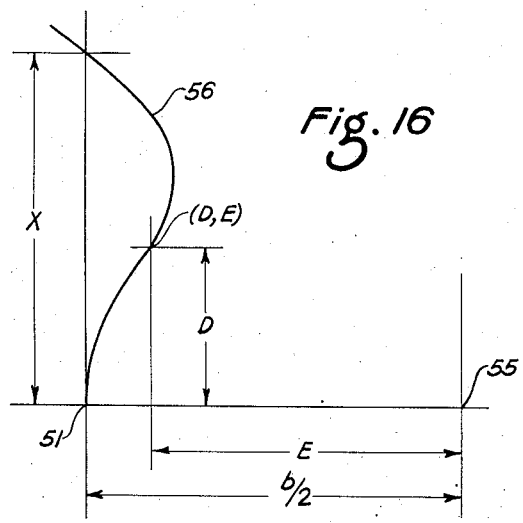
Fig. 16
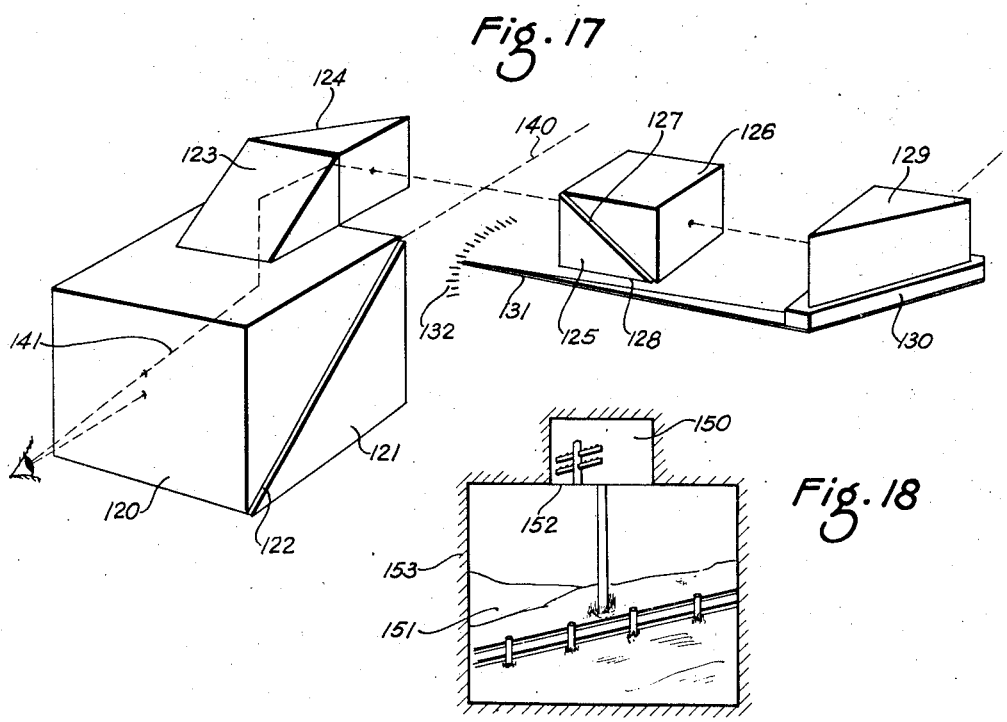
Fig. 17
Fig. 18
Pompey Mainardi
Marcus N. Mainardi
INVENTORS
BY
ATTORNEYS Patented May 10, 1949

2,469,927

UNITED STATES PATENT OFFICE 2,469,927

INFINITY SIGHT VIEW FINDER

Pompey Mainardi and Marcus N. Mainardi,
Hawthorne, N. J.

Application August 6, 1947, Serial No. 766,678

9 Claims. (Cl. 88—1.5)

This invention relates to view finders and particularly to infinity sight type of view finders.

It has previously been proposed to employ the cut-off which occurs when viewing through an optical element at about the critical angle of refraction, to define the edges of the field of view of a view finder. This has the advantage of all infinity sights in that movement of the eye relative to the viewing device causes the cut-off line to shift along so that the frame appears in the same position at infinity. Such known systems have the disadvantage, however, that the edge of the field thus defined is not straight but is rather, very definitely curved.

The object of the present invention is to provide a similar system in which the edges of the field are quite straight.

It is common practice to refer to a field frame when describing a view finder because the original view finders merely consisted of some mechanical frame. Such a description is not quite proper since actually the effect one is trying to obtain is that represented by a rectangular pyramid having its apex at the eye of the observer, which pyramid corresponds to the field of view from a camera lens. The present invention will be described with reference to such a geometrical pyramid, the proper field of view as found by the view finder being that seen within the pyramid from the apex thereof. The four sides of the pyramid correspond to the four sides of the rectangular field of view. More specifically the field of view at infinity is the area bounded by the intersections of the pyramid sides with the plane at infinity. When a finite aperture is used or when the observer's eye is moved about, the pyramid shifts slightly but in its various positions the intersection at infinity is still the same. The sides of the pyramid are effectively but not absolutely flat, for various reasons including an offset where the sides pass through a layer of optical refractive material. The dimensions of the field of view are defined as the angular dimensions of the pyramid at its apex. The present invention is required only for view finders operating over the fields corresponding to ordinary cameras, i. e. over fields in which the angular dimensions of the geometrical pyramid are both greater than ten degrees since at very small angles the curvature of the frame lines as it occurs in the prior art was not objectionable.

According to the invention a view finder includes a layer or block of light refractive material with parallel entrance and exit surfaces. In a preferred form of the invention, the entrance and exit surfaces are orthogonal to the optic axis of the finder which obviously corresponds to the central axis of the pyramid described above. Thus the block is a sort of window which is used either by itself or in combination with other optical elements. The entrance and exit faces are always parallel to each other but need not be flat or orthogonal to the optic axis; they may conveniently be pyramidal in form when the whole unit is made up of a number of prisms but this is less preferable. In order to define each edge of the field of view, a flat layer is located in the block with a lower refractive index than that of the adjacent material of the block. This layer (one for each side of the field) is located obliquely in the block at the critical optical angle to a sheet of rays forming a side of the pyramid and directed toward the apex as said sheet of rays is refracted through the block. Thus, light is transmitted only if it is angularly within the pyramid. Since all the rays passing through the block emerge in the same direction at which they entered, all rays within the pyramid and reaching the apex are angularly within the pyramid. It should be clear that a sheet of rays forming a side of a pyramid before refraction through the block does not form the side of a pyramid after refraction. Furthermore, upon refraction, the sheet of rays no longer forms an absolute plane.

A finder constructed as indicated above provides an infinity sight view finder with straight boundaries. However, if the flat layer is an air layer, the above conditions cannot be fulfilled and the eye does not see a straight line but rather sees a curved line boundary. This is not itself surprising when one notes that a line drawn from an eye situated in the dense medium to a flat surface at the critical angle and then moved about the surface to remain at the critical angle, generates a cone intercepting the surface in a circle.

We have discovered, however, that this cone of light within the block of refractive material need not define a curved edge of the field of view as seen by the observer. In fact we have found for all practical purposes the edge may be made to appear substantially straight all the way to infinity in both directions, i. e. all the way to a 90° angle of view on each side of the optical axis. Obviously this is far beyond the need in ordinary practical instruments, and it is quite satisfactory to provide a device in which the apparent line is straight out to 45° on each side of the optical axis, allowing a total angular field of view of 90°.

For reasons explained below, this result can be obtained by proper selection of the index of refraction of the flat layer relative to that of the adjacent material of the block. Of course the critical angle depends on the difference of the indices of refraction at the layer and hence as different materials are used, the angle is changed between the layer and the entrance and exit surfaces of the block, since the boundary must be made to appear in the same direction.

We have found that when this angle between the surfaces of the block and the layer is A and the index of refraction of the layer is $N_1$ and that of the block material is N, the cut-off line appears substantially straight from the center thereof out to a point a little beyond the angle $x$ when $$\tan A = \frac{\sqrt{N_1^2 - \sin^2 x} - N_1 \cos x}{\sqrt{N^2 - N_1^2}(1 - \cos x)}$$

By way of a specific example, if the block is made of glass having an index of refraction of 1.55 and the layer instead of being air as in the prior art is made of material such as calcium fluoride having an index of refraction of about 1.38, one can apply this formula out to an angle of $x=45°$ on each side of the optic axis which gives $A=45°\ 21'$, and the edge will not deviate from straightness more than ½° over the whole 90° field.

The operation of the invention will be fully understood from the following description when read in connection with the accompanying drawings.

Fig. 1 illustrates a simple form of the prior art and Fig. 2 the field of view obtained therewith.

Fig. 3 shows a direct modification of the arrangement shown in Fig. 1 to incorporate the present invention, Fig. 4 being the field of view obtained therewith.

Figs. 5 and 6 are included to explain the operation of the invention.

Fig. 7 shows a family of curves corresponding to variations in index of refraction of the critical layer.

Figs. 8 to 12 inclusive illustrate various preferred embodiments of our invention.

Figs. 13 to 15 inclusive illustrate modifications of the invention to combine it with view finders of the inverted Galilean telescope type.

Fig. 16 is to illustrate the terms used in mathematical derivations pertinent to the invention.

Fig. 17 schematically shows the combination of a critical angle view finder and a range finder; Fig. 18 shows the range finder field.

In Fig. 1 a glass plate 10 is provided with polished notches 11 oriented at the critical angle to the principal ray in the refracted sides of the desired pyramidal field of view. Since the notches 11 contain air, the sides of the "pyramid" defined thereby are not flat and the edges of the field of view 13, as seen in Fig. 2, are curved so as to have barrel distortion.

In Fig. 3 the block of optional material 15 is provided with layers 16 containing a material whose index of refraction is considerably greater than that of air but is still somewhat less than that of the block 15 or at least less than the portions of the block 15 which are adjacent to the layers 16. The layers 16 are oriented at the critical angle as before, which in this case is slightly greater than the critical angle when air is used. The index of refraction of the layer should be at least .10 less than the block or at least less than the part of the block which is adjacent to the layer, but should not be more than .25 less than that of the adjacent parts of the block. Obviously the index of refraction at the center of the block is immaterial to the present invention and the center of the block may be made of any material. This arrangement results in a field of view whose edges appear to be absolutely straight. In practice, even the most exacting inspection fails to detect the residual deviation from straightness even though such residual deviation is known to exist because of the trigonometry of the relationship. When referring to that part of the block adjacent to the edge defining layers, we mean all of the block which transmits critical rays to the layers. If the layer extends some distance through the block, the permissible movement of the eye position is correspondingly extended and in certain embodiments of the invention described below the whole block of glass must, therefore, be considered as adjacent to the edge defining layer or layers.

Figs. 5, 6 and 7 explain how a critical angle phenomenon which is fundamentally a cone can turn out to give a straight line rather than a circle as seen by the eye of the observer.

In Fig. 5 two glass prisms 20 and 21 are separated by a layer 22 whose index of refraction is lower than that of the glass. A horizontal line 23 is indicated across the middle of the hypotenuse face of the prism 21 for reference. Light from a point 24 on the line 23 passing to the mid-point 25 of the exit face of the prism 21 is at the critical angle 26 measured between the ray and the normal 27 to the layer 22. That is, any light arriving, through the prism 20, at the point 24 at greater than the critical angle is reflected back into the prism 20 but light coming to the point 24 at less than this angle 26 is transmitted through layer 22 to and through the prism 21. The critical ray is that from the point 24 to the point 25 which then emerges from the prism 21 to pass to the point 30. The rays from the point 25 to any point on the circular curve 31 are all at the same angle to the surface 22, i. e. are at the critical angle. Therefore, if one were to place one's eye at the point 25, one would see light coming through the layer 22 from all points inside the arc of the circle 31 but would see only a black area to the left of this circle (assuming, of course, that the only light is that coming into the prism 20 from behind). However, after refraction at the point 25 (because of the angle A of the prism 21) these rays from the circle 31 to the point 25 emerge not on the surface of a cone, but rather on a surface of irregular shape which approximates a flat plane if the angle A and the index of refraction of the layer 22 are properly chosen. Thus the points 32 are all substantially directly below the point 30.

While the line 30—33 is the one most easily drawn when analyzing the effect of different indices of refraction, this is, of course, not the line seen by the observer's eye which, as shown in Fig. 6, is located at the point 30 itself. The ray 24—25—30 reaches the point 30 and the eye of the observer as it did in Fig. 5. However, any other critical ray reaching the eye comes from a different curve system. For example, the ray 35 comes from a point comes from a point 36 on a curve 37 whose principal point 38 is in the same horizontal plane as a point 39 from which light passes to the eye 30. Since the points 32 in Fig. 5 are substantially directly below the point 30, a moment's consideration will show that the point 39 in Fig. 6 is directly above the point 25. Thus the eye at the point 30 sees a vertical straight line 40 corresponding to the critical rays passing through the layer 22 and the eye 30 receives light from the right of the line 40 but not from the left thereof. Furthermore, since the prisms 20 and 21 together form a flat block with parallel entrance and exit faces, and since the layer 22 also has parallel faces, this envelope of critical rays tracked back through the prism 20 will give a sheet of rays in which each ray is parallel to its corresponding segment on the eye side of the prism 21. The observer in practice is not at all concerned with the shape of this envelope of rays either inside the prisms 20 and 21 or outside the prism 20. Since all the critical rays outside the prism 20 are parallel to the plane defined by the line 40 and the eye position 30, they must meet this plane at infinity. In other words, these rays intersect the infinity plane in the same line as does the plane formed by the line 40 and the eye position, which intersection is the left boundary of the field of view. Since the sheet of rays through line 40 and eye position 30 form one side of the view finder pyramid discussed in detail above, the sheet of refracted rays inside the prism is also considered to be the side of the pyramid "in the block."

If the layer 22 is of air, the resulting curve 40 has a shape such as shown at 41 in Fig. 7. If the index of the layer 22 is increased and the angle A is simultaneously increased in order to maintain the cut-off line at the edge of the field of view, the cut-off curve 40 successively takes the shapes 42, 43, 44, 45 and 46 shown in Fig. 7.

If one wants to have the point 50 directly above the point 51 as it is on curve 44 but is not on curve 41, one must select the arrangement which gives the curve 44. This would mean that the cut-off line is substantially flat out to the point 50 which covers a field of about 60° on each side of the axis. Camera view finders do not normally require this wide coverage and curve 45 is perhaps even better for finders covering 45° on each side of the axis. It will be noted that the curve 45 is substantially flat all the way from the point 51 to the point 52 although mathematically it is the point 53 which is directly above the point 51. Mathematically it can be shown that the angle represented by the point 53 on curve 45 or the point 50 on curve 44 is $x$ when $$\tan A = \frac{\sqrt{N_1^2 - \sin^2 x} - N_1 \cos x}{\sqrt{N^2 - N_1^2}(1 - \cos x)}$$

where N is the index of refraction of the prisms 20 and 21, $N_1$ is the index of refraction of the layer 22, A is the angle of the prism 21 and $x$ is the angle of elevation of the point 53 above the point 51. In order to cover an angular field of view having angular dimensions $a$ by $b$, the value of the angle $x$ should preferably be $$\frac{a}{2}$$

but may have any value between $$\frac{a}{4}$$

and $a$. If a field of view is considerably different from a square so that $a$ differs considerably from $b$, then it is preferable to have the value of $x$ between $$\frac{a}{2} \text{ and } \frac{b}{2}$$

for both dimensions of the field. Since the prism angle will be different in the two dimensions when the field of view is not square, the value of $x$ will necessarily be different, especially if the layers corresponding to the sides and top and bottom of the field all have the same index of refraction. Both values of the angle of elevation of the point 53 should be between $$\frac{a}{2} \text{ and } \frac{b}{2}$$

For all practical purposes these results are obtained when the value of the index of refraction $N_1$ of the layer is between $N-.10$ and $N-.25$ where N is the index of refraction of the block.

Although all of the theory necessary for an understanding of the invention has been set forth in detail, Fig. 16 is included since it may be of interest to those wishing to delve further into the mathematical derivations. The curve 56 is a general boundary curve and the point D, E is any point thereon measured from the axis of the finder which intersects the prism face normally at point 55. The crossing over point has coordinates $$\frac{b}{2}$$

$x$ as above discussed. The following pertinent equations may be derived directly, the symbols being those used throughout this specification.

The general equation of the apparent boundary curve is:

$$\sin D = \frac{\cos A \sqrt{N_1^2 - \sin^2 E} - \sin A \sqrt{N^2 - N_1^2}}{\cos E}$$

The half field angle:

$$\sin \frac{b}{2} = N_1 \cos A - \sqrt{N^2 - N_1^2} \sin A$$

The crossing over relations are:

$$\tan A = \frac{\sqrt{N_1^2 - \sin^2} - N_1 \cos x}{\sqrt{N^2 - N_1^2}(1 - \cos x)}$$

as given above and $$\cos A = \frac{\sin \frac{b}{2}(N_1 + \sqrt{N_1^2 - \sin^2 x})}{1 + \cos x}$$

For minimum D (the most extreme right hand point on the curve):

$$\sin^2 E = N_1^2 - \frac{(N_1^2 - 1)^2}{(N^2 - N_1^2) \tan^2 A}$$

and $$\sin D_{min} = \frac{\cos A}{\sqrt{N_1^2 - 1}} \sqrt{(N_1^2 - 1) - (N^2 - N_1^2) \tan^2 A}$$

These equations permit direct calculation of residual deviations from straightness, but for all practical purposes, boundaries according to the present invention are perfectly straight.

In Fig. 8 the block 60 is made up of a number of glass prisms with the layer 61 corresponding to the right hand side of the field pyramid as seen by the eye 65; 62 corresponds to the left hand edge of the field, 63 corresponds to the top of the field, and 64 corresponds to the bottom of the field. In Fig. 9 the right, left, top and bottom edges are provided respectively by layers 71, 72, 73 and 74 in the compound block 70. In Fig. 10 the corresponding layers are 81, 82, 83 and 84. In Fig. 11 the corresponding layers are 91, 92, 93 and 94. Obviously there is a multitude of ways in which to arrange the low index layers in the block of refractive material. One simple way is shown in Fig. 12 wherein the layers form the sides 101, 102, 103 and 104 of a pyramid with its apex at the point 105, but this pyramid is not the pyramid of the field of view which has its apex at the eye position no matter where the eye moves. The shortcoming of the arrangement shown in Fig. 12 is immediately obvious in practice since the four frame lines are complete only when the eye is located on the central axis of the physical pyramid. The lines thereto remain in their correct position, effectively at infinity as the eye moves about, but parts of the lines are cut off and the other lines extend beyond the field of view. This is not true with the corresponding arrangement shown in Fig. 9 where all four layers extend to all sides of the block.

In Fig. 9 as shown the entrance and exit faces are flat and orthogonal to the axis indicated as a line of sight to the eye. If the pyramidal prism 75 is removed, the exit face is pyramidal and no longer parallel to the entrance face 76. However, if this entrance face 76 is made pyramidal and parallel to the exit face e. g. by placing a prism similar to but larger than 75 in front of the whole unit, the device is still useful as a view finder although the image is offset along the diagonals of the field.

It has been suggested that the lack of straightness of the apparent edge of the field might be improved by curving the entrance and exit surfaces of the block. This does not seem to be the case, however. It has been shown that if the two faces of prism 21 of Fig. 5 are planes, the boundary appears at infinity both with respect to focus and with respect to the movement of the eye. If the front surface is curved, then any parallel bundle of rays from a point at infinity cannot all strike the flat layer 22 at the critical angle. Similarly, if the exit face is curved, the boundary no longer appears at infinity since a bundle of critical parallel rays from the flat layer cannot emerge as a parallel bundle. This finder then ceases to be an infinity sight. On the other hand, such curved surface 110 as shown in Fig. 15 may be useful to compensate for the effect of the dioptric power in a Galilean telescope made up of a negative lens 111 and a positive eyepiece 112. A simpler arrangement for doing the same thing is shown in Fig. 13 wherein the block 113 according to the present invention is placed immediately ahead of the lens 111 and may take any of the forms shown in Fig. 8 to Fig. 12. The system shown in Fig. 13 is a highly preferred one since the lens system restricts the bundles of rays from one side of the field to the corresponding half of the negative lens and also to the corresponding low refractive layer. This overcomes the cutting off of the boundaries which as mentioned above is an objection to the Fig. 12 arrangement. Fig. 14 similarly solves the problem by curving the low refractive layer 114 in the block 115, which is again placed between the lenses, but from a manufacturing point of view this is not a desirable arrangement because of the difficulty of producing the cylindrical surfaces to hold the layer 114.

In Fig. 17, a view finder according to the invention is combined with a split field range finder. The prisms 120 and 121 with a low index layer 122 between them represent that part of the view finder which forms the upper edge of the field of view. That is, the layer 122 corresponds to the layer 63 of Fig. 8, the layer 83 of Fig. 10 or the layer 93 of Fig. 11. Instead of having the upper surface of the prism 120 all black or enclosed in housing to prevent light being reflected from the layer 122, a portion of this region beyond the field of view, is employed for range finding, the range finder field being introduced by prisms 123 and 124. The appearance of the whole field of view is shown in Fig. 18. The view finder field is indicated at 151; the auxiliary field of view is labeled 150, and there is a dividing line 152 between the two fields, as is common in the critical angle beam splitters. The rest of the region beyond the field of view indicated at 153 appears perfectly black since no other light is admitted to the sides of the system.

In order to obtain proper cut-off of the lower edge of the auxiliary field 150 to prevent overlapping at the line 152, it is desirable to use the critical angle principle once again so as to have the same cut-off for all eye positions. That is, the cut-off line 152 is effectively placed at infinity in the same way as the edges of the field of view. To do this, prisms 125 and 126 with a low index layer 127 between are positioned in the range finder deflected beam with the layer 127 effectively parallel to the layer which defines the lower edge of the field of view 151. The layers which define the sides and lower edge of this field 151 are not shown in Fig. 17, but are shown in Figs. 8 to 15. The right hand viewing point of the range finder system consists of a prism 129 which receives light from the target being ranged and directs it through the prism unit 125 and 126 to the prism 124 and thence adjacent the edge of the view finder system. For ranging purposes, prism 129 is carried on a mount 130 which is pivoted and the adjustment thereof is indicated by a long pointer 131 and a scale 132. The main line of sight of the view finder is indicated at 140, whereas the critical ray from the boundary line 152 is indicated at 141.

The range finder operates in the same manner as any split field range finder, the unique features thereof being the utilization of the low index layer 122 for combining the range finder with the view finder and the addition of the layer 127 in order to locate the lower edge of the field 150 "at infinity" to match the upper edge of the field 151.

Having thus described various arrangements of our invention, we wish to point out that it is not limited to the above described embodiments, but is of the scope of the appended claims.

We claim:

1. A view finder for finding a rectangular field defined by a geometrical pyramid having angular dimensions $a$ by $b$ each greater than 10° at the apex which corresponds to the eye position, comprising a block of light refractive material with parallel entrance and exit surfaces transverse to the central axis of the pyramid, a flat layer of non gaseous material with a refractive index between .10 and .25 less than that of the adjacent material of the block corresponding to each side of the rectangular field located obliquely in the block at the critical angle of refraction to the side of the pyramid in the block to transmit only light angularly within the pyramid characterized by tan A equaling $$\frac{\sqrt{N_1^2 - \sin^2 x} - N_1 \cos x}{\sqrt{N^2 - N_1^2}(1 - \cos x)}$$

and tan B equaling $$\frac{\sqrt{N_2^2 - \sin^2 y} - N_2 \cos y}{\sqrt{N^2 - N_2^2}(1 - \cos y)}$$

where A is the angle between the layer and said surfaces and $N_1$ the index of refraction of the layer for each of the $a$ angle sides of the field, B and $N_2$ are the corresponding angle and index for the $b$ angle sides of the field, N is the index of the block material adjacent to the layers, $x$ is between $$\frac{a}{4} \text{ and } a$$

and $y$ is between $$\frac{b}{4} \text{ and } b$$

2. A view finder according to claim 1 in which the entrance and exit surfaces are flat and orthogonal to the central axis of the pyramid.

3. A view finder for finding a rectangular field defined by a geometrical pyramid having angular dimensions $a$ by $b$ each greater than 10° at the apex which corresponds to the eye position, comprising a block of light refractive material with parallel entrance and exit surfaces transverse to the central axis of the pyramid, a flat layer of non gaseous material with a refractive index between .10 and .25 less than that of the adjacent material of the block corresponding to each side of the rectangular field located obliquely in the block at the critical angle of refraction to the side of the pyramid in the block to transmit only light angularly within the pyramid, characterized by tan A substantially equaling $$\frac{\sqrt{N_1^2 - \sin^2 \frac{a}{2}} - N_1 \cos \frac{a}{2}}{\sqrt{N^2 - N_1^2}\left(1 - \cos \frac{a}{2}\right)}$$

and tan B substantially equaling $$\frac{\sqrt{N_2^2 - \sin^2 \frac{b}{2}} - N_2 \cos \frac{b}{2}}{\sqrt{N^2 - N_2^2}\left(1 - \cos \frac{b}{2}\right)}$$

where A is the angle between the layer and said surfaces and $N_1$ the index of refraction of the layer for each of the $a$ angle sides of the field, B and $N_2$ are the corresponding angle and index for the $b$ angle sides of the field, N is the index of the block material adjacent to the layers.

4. A view finder according to claim 3 in which the entrance and exit surfaces are flat and orthogonal to the central axis of the pyramid.

5. A view finder for finding a rectangular field defined by a geometrical pyramid having angular dimensions $a$ by $b$ each greater than 10° at the apex which corresponds to the eye position, comprising a block of light refractive material with parallel entrance and exit surfaces transverse to the central axis of the pyramid, a flat layer of non gaseous material with a refractive index between .10 and .25 less than that of the adjacent material of the block corresponding to each side of the rectangular field located obliquely in the block at the critical angle of refraction to the side of the pyramid in the block to transmit only light angularly within the pyramid characterized by tan A equaling $$\frac{\sqrt{N_1^2 - \sin^2 x} - N_1 \cos x}{\sqrt{N^2 - N_1^2}(1 - \cos x)}$$

and tan B equaling $$\frac{\sqrt{N_1^2 - \sin^2 y} - N_1 \cos y}{\sqrt{N^2 - N_1^2}(1 - \cos y)}$$

where $N_1$ is the index of refraction of the four layers, N is the index of the block material adjacent to the layers, A and B are the angles between said surfaces and the layers for the $a$ and $b$ angle sides of the field respectively and $x$ and $y$ are both between $$\frac{a}{2} \text{ and } \frac{b}{2}$$

6. A view finder according to claim 5 in which the entrance and exit surfaces are flat and orthogonal to the central axis of the pyramid.

7. A view finder according to claim 1 in which reflectors are provided for receiving light from a viewing point spaced from that of the view finder and for directing it to the back of one of the flat layers to be totally internally reflected to the eye position adjacent to the side of said geometrical pyramid to form with the view finder field a range finder split field.

8. A view finder according to claim 3 in which reflectors are provided for receiving light from a viewing point spaced from that of the view finder and for directing it to the back of one of the flat layers to be totally internally reflected to the eye position adjacent to the side of said geometrical pyramid to form with the view finder field a range finder split field.

9. A view finder according to claim 5 in which reflectors are provided for receiving light from a viewing point spaced from that of the view finder and for directing it to the back of one of the flat layers to be totally internally reflected to the eye position adjacent to the side of said geometrical pyramid to form with the view finder field a range finder split field.

POMPEY MAINARDI.
MARCUS N. MAINARDI.

REFERENCES CITED

The following references are of record in the file of this patent:

UNITED STATES PATENTS

| Number | Name | Date |
|---|---|---|
| 2,264,504 | Bertele | Dec. 2, 1941 |

FOREIGN PATENTS

| Number | Country | Date |
|---|---|---|
| 454,064 | Great Britain | Sept. 23, 1936 |

Certificate of Correction

Patent No. 2,469,927.  May 10, 1949.

POMPEY MAINARDI ET AL.

It is hereby certified that errors appear in the printed specification of the above numbered patent requiring correction as follows:

Column 3, line 64, for "optional" read *optical*; column 4, line 69, after the word "point", first occurrence, strike out "comes from a point"; and that the said Letters Patent should be read with these corrections therein that the same may conform to the record of the case in the Patent Office.

Signed and sealed this 18th day of October, A. D. 1949.

[SEAL]

THOMAS F. MURPHY,
*Assistant Commissioner of Patents.*